United States Patent
Van Horssen (10) Patent No.: US 7,322,775 B2
(45) Date of Patent: Jan. 29, 2008

(54) QUICK CHANGE HOLDER FOR CUTTING TOOL

(76) Inventor: Charles A. Van Horssen, 21622 N. 14th Ave., Phoenix, AZ (US) 85027

( * ) Notice: Subject to any disclaimer, the term of this patent is extended or adjusted under 35 U.S.C. 154(b) by 0 days.

(21) Appl. No.: 11/366,139

(22) Filed: Mar. 2, 2006

(65) Prior Publication Data

US 2006/0280566 A1 Dec. 14, 2006

Related U.S. Application Data

(63) Continuation-in-part of application No. 11/148,118, filed on Jun. 8, 2005, now Pat. No. 7,153,069.

(51) Int. Cl.
*B23B 27/00* (2006.01)
(52) U.S. Cl. .................................. 407/111; 407/91
(58) Field of Classification Search ................ 407/111, 407/91, 107, 66, 67, 113
See application file for complete search history.

(56) References Cited

U.S. PATENT DOCUMENTS 4,697,963 A * 10/1987 Luck .......................... 407/105
6,773,210 B2 * 8/2004 Erickson ..................... 407/102
6,814,526 B2 * 11/2004 Shiraiwa et al. ............ 407/110
7,073,986 B2 * 7/2006 Andras ....................... 407/113
7,153,069 B1 * 12/2006 Van Horssen ............... 407/111

* cited by examiner

*Primary Examiner*—Willmon Fridie, Jr.
(74) *Attorney, Agent, or Firm*—Frank J. McGue (57) ABSTRACT

A self contained, toolless quick change tool holder for cutter inserts on machine tools comprises a housing having at least one seat portion which is adapted to receive and conform to the shape of a cutter insert. A clamping arm is mounted in the insert housing. The clamping arm is movable within the insert housing and includes a a clamp portion extending over the seat portion. The clamp portion engages a cutter insert. A locking mechanism is contained within the housing and has a clamp position which forces the clamp portion to engage a cutter insert and a release position which forces the clamp portion to disengage from a cutter insert to allow removal and replacement of said cutter insert. The locking mechanism moves between the release position and the clamp position.

8 Claims, 7 Drawing Sheets

QUICK CHANGE HOLDER FOR CUTTING TOOL

RELATED APPLICATION

This is a continuation-in-part of patent application Ser. No. 11/148,118 filed Jun. 8, 2005, now U.S. Pat. No. 7,153,069.

TECHNICAL FIELD

This invention relates generally to the field of cutting tool holders, and, more particularly, to an improved cutting tool holder which avoids the need for tools to change cutting tools thereby providing the ability to quickly change cutting tools as needed in machine shops.

BACKGROUND OF THE INVENTION

In the metal cutting or machining industry, metals and other hard materials are made into a desired finished shape by various cutting operations. The cutting tools used in the industry have sharp edges and are manufactured from materials that are much harder than those being cut. However, the forces involved in cutting metals and other hard materials are substantial and thus the cutting tools and the materials being cut must be held extremely securely with a very high degree of rigidity. In addition, the geometry of the cutting edges of said tools is very broad and strong when compared, for example, to the edge of a knife blade. This very broad edge also further increases the cutting forces required.

There are two general modes of cutting that are performed in the industry. The first is external cutting where material is removed from the exterior surfaces of the raw material or part to be machined. An analogous cutting technique would be peeling an apple.

The second cutting mode in internal cutting where material is removed from surfaces which are surrounded by the material itself such as drilling a hole. Carrying the analogy further, an example of internal cutting is coring the apple.

There are also two general types of machining techniques employed in the industry which can be used for either cutting mode. In the first technique, the material to be machined (hereinafter the "workpiece"), is rotated rapidly and continuously in a lathe spindle. The cutting tool is brought into contact with the rotating workpiece causing removal of material. This technique is known in the industry as turning and the modern lathe is called a turning center.

In the second technique, the workpiece is rigidly held in a fixed position and rapidly rotating cutting tools are brought into contact therewith thereby causing material to be removed. This technique is known as milling and the machine is a milling machine. However, modern machine tools often have both milling and turning capabilities in the same machine. Such dual capable machines are called machining centers.

There are three general shapes of tools in use today. The first shape is the drill and related hole making tools such as reamers and boring bars. Some of the larger tools in this category use inserts described below, but much of the hole making tooling is made from solid materials. Hole making tools are solely used in the internal cutting mode.

The second shape is an end mill which is essentially a short stout drill that cuts with its sides. End mill tools are used in mills or machining centers and can cut in either the internal cutting or external cutting modes. Larger diameter end mills may use inserts as described below.

The last and most common shape is the insert tool. Inserts are commonly made from, or coated with, very hard materials such as silicon carbide, ceramic or even diamond. Inserts are made in small flat pieces in the shape of rhomboids, circles, triangles or other polygons. Inserts are often provided with a hole in the center thereof that allows them to be fitting into holders and secured therein with clamps and screws.

As metal cutting proceeds, the insert will wear down and must be periodically replaced with another identical insert. Often times, inserts will have more than one cutting edge or tip that can be used. Thus, the insert can be flipped over, or rotated, or both to bring another tip into use. A square or rhomboid insert can have up to eight tips that can be used until the insert is discarded. While inserts are almost never sharpened for reuse, the inserts are recycled for their cobalt content. In contrast, the insert holder is generally reusable forever.

At present, all insert changes must be performed manually using tools. Since most inserts are held in place with two different sized allen screws, it takes a relatively long time to change an insert. There is no automated technique for replacing or realigning such inserts. The operator must be highly skilled to properly change or realign said insert and, conversely, this skill level leads to frequent incorrect installations. Such incorrect installations can lead to significant scrap losses. In addition, both the screws holding said inserts and the threaded holes receiving said screws wear or strip out. As a consequence, operators of insert equipped machinery simply do not like to change inserts.

There have been some attempts to address these issues. U.S. Pat. No. 5,683,212 entitled "Clamping Assembly for Tapered Hollow Shank of Tooling System" which issued on Nov. 4, 1997 to Cirino et al. discloses a clamping assembly for a cutter holder tool which includes a button 40 which clamps against a tapered shank so that said tool is urged inwardly by a spring (not shown) seated on the reduced diameter land 60.

U.S. Pat. No. 4,420,280 entitled "Tool Block" which issued on Dec. 13, 1983 to Gustafson shows a tool block for a lever actuated quick release mechanism which is provided with a cutting insert holder 12 and a clamping device comprised of a pivotally arranged lever 20, one end of which acts on the cutting insert holder 12 while the other end of which cooperates with a spring loaded device 21.

U.S. Pat. No. 3,981,607 entitled "Boring Bar with Removable and Indexable Cutting Insert" which issued on Sep. 21, 1976 to Jorgensen has a manual button 100 release mechanism for a cutting insert 12 which may be removed by releasing the pressure applied to the finger 28 through the clamp insert 14 by means of a manual button 100 which, when depressed, will contact the forward end 83 of the wedge shaft 74 thereby forcing the wedge shaft 74 to the right causing the ball 84 and the clamp release pin 60 to drop down.

U.S. Pat. No. 4,210,038 entitled "Lathe Having a Guided Movable Cutter" which issued on Jul. 1, 1980 to Hill provides a cutting tool holder which includes vertical positioning knob 17 and a coarseness selector handle 17 for adjusting the positioning of the cutter holder.

None of the known prior art disclose the combination set forth herein.

SUMMARY OF THE INVENTION

It is an object of this invention to provide an improved holder for quick changes of cutter inserts.

It is a further object of this invention to provide an improved holder which requires no tools or screws for securing or removing a cutter insert.

It is still another object of this invention to provide an improved holder which is designed for manual operation but is capable of being automated.

It is an object of this invention to provide an improved holder for cutting inserts which reduces scrap by not closing if incorrect installation.

It is still another object to provide an improved holder for cutting inserts which can be changed in seconds.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
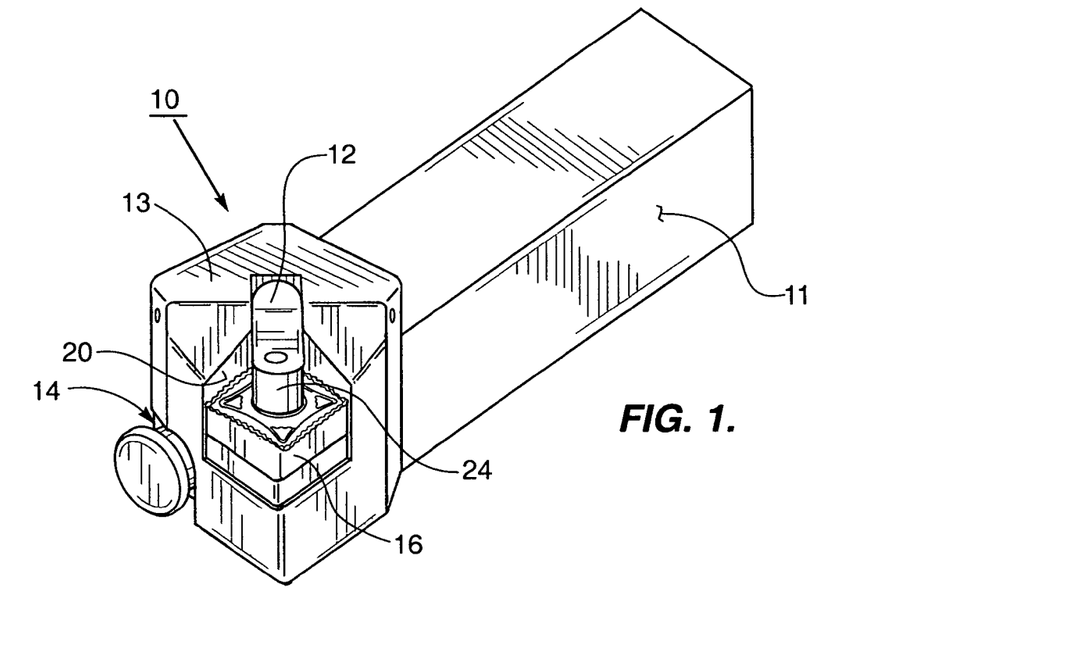
FIG. 1 is a perspective view of the present invention with a cutter insert installed.
Figure 2:
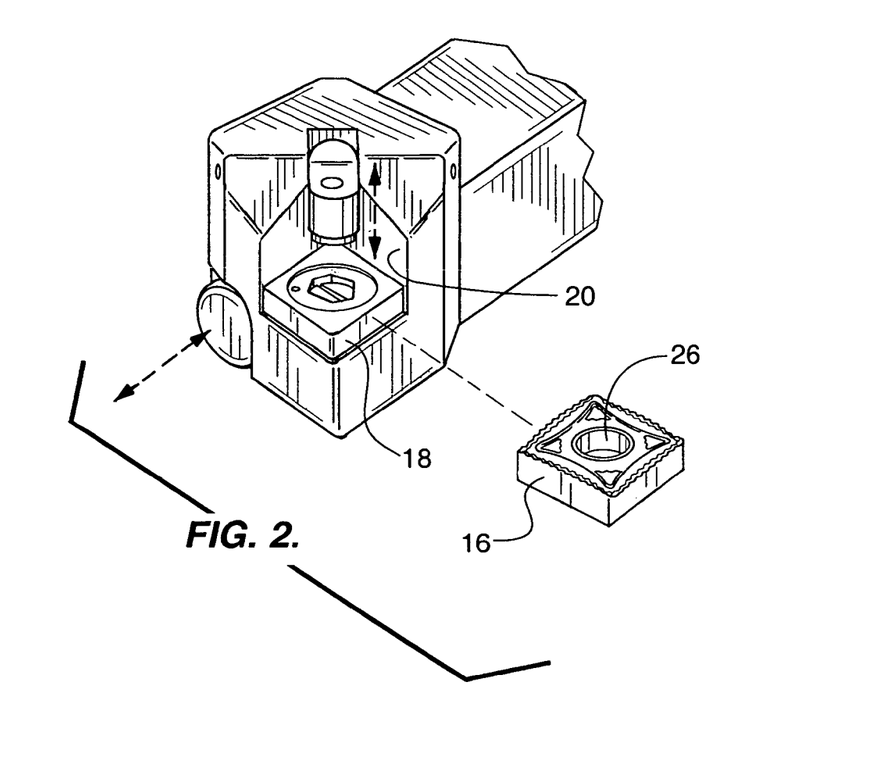
FIG. 2 is a perspective view of the present invention with the cutter insert removed.
Figure 3:
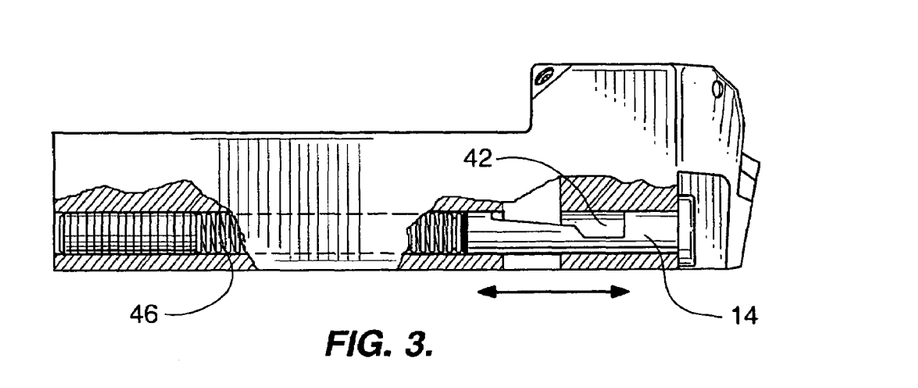
FIG. 3 is a partial cross sectional side view of the present invention showing a cam.
Figure 4:
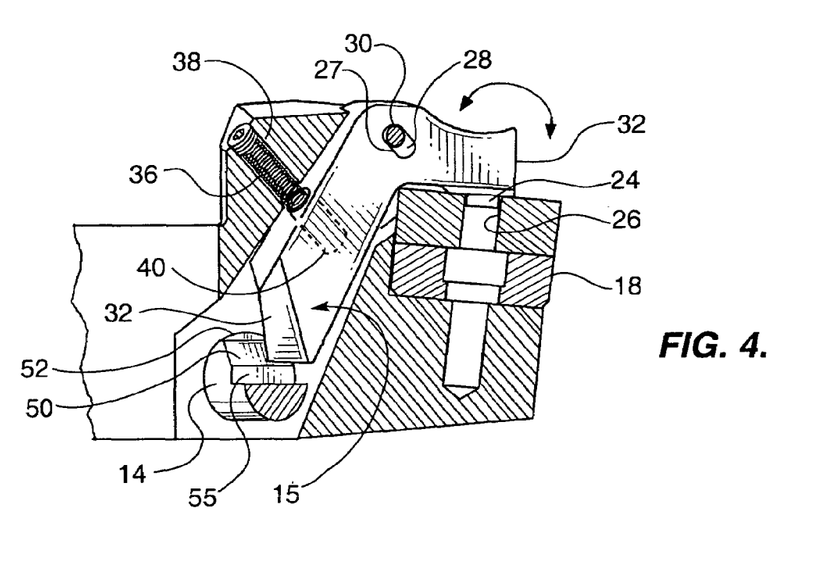
FIG. 4 is a cross sectional view of a clamping arm engaging the cutter insert.
Figure 5:
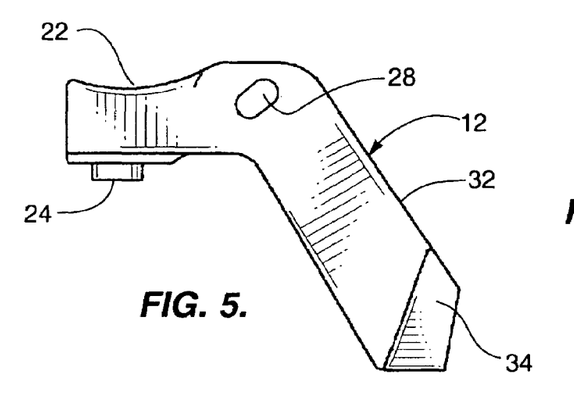
FIG. 5 is a side view of the clamping arm.
Figure 6:
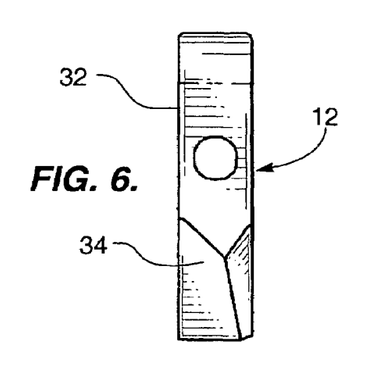
FIG. 6 is a rear view of the clamping arm.
Figure 7:
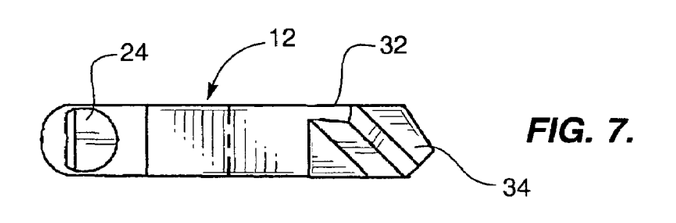
FIG. 7 is a bottom view of the clamping arm.
Figure 8:
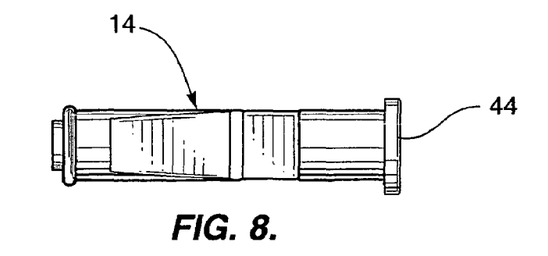
FIG. 8 is top view of the cam.
Figure 9:
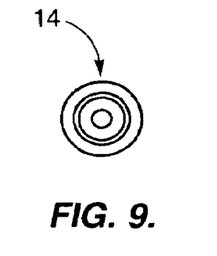
FIG. 9 is a rear view of the cam.

Referring more particularly to the drawings by characters of reference, FIGS. 1-3 disclose combinations of features which constitute the components of a self contained, toolless quick change tool holder 10 for holding cutter inserts 16 on machine tools. Self contained, toolless quick change tool holder 10 comprises a housing 13 having at least one seat portion 18 which is adapted to receive and conform to the shape of cutter insert 16. A clamping arm 12 is movably mounted in housing 13. Clamping arm 12 has a clamp portion 22 extending over seat portion 18, clamp portion 22 adapted to engage cutter insert 16. A locking mechanism 15 is completely contained within housing 13 whereby no external tools are needed to actuate said locking mechanism. Locking mechanism 15 has a clamp position which forces clamp portion 22 of clamping arm 12 to engage cutter insert 16 and a release position which forces clamp portion 22 to disengage from cutter insert 16 to allow removal and replacement of said cutter insert, locking mechanism 15 being movable between the release position and the clamp position without the use of external tools such as allen wrenches and the like.

As best seen in FIGS. 1-12, one embodiment of self contained, toolless quick change tool holder 10 which comprises cutter insert housing 13 with clamping arm 12 thereto. In this embodiment, locking mechanism 15 comprises a clamping arm 12 and cam 14 to speed the process of changing cutter insert 16.

Figure 12:
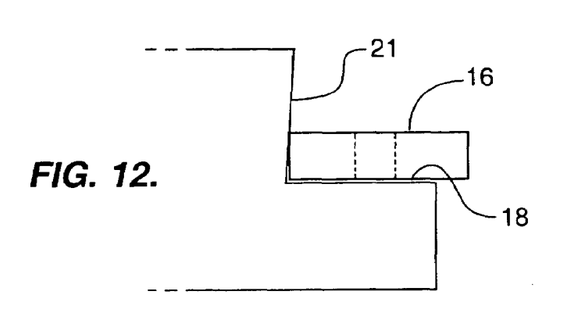
FIG. 12 is a side view of a cutout bench used in the present invention.

In this example, cutter insert 16 has a rhomboid cross section. To accommodate cutter insert 16, cutter insert housing 13 positions seat portion 18 in a cutout bench 20 which receives and conforms to the shape of cutter insert 16. Seat portion 18 is shown in as a separate piece but may, in fact, be integrally formed with insert housing 13. Alternatively, seat portion 18 can also be a replaceable part. As discussed previously, cutter insert 16 can have a multiplicity of shapes. Those skilled in the art will recognize that the present invention is not limited to the illustrated shapes and sizes, but such are exemplary in nature only. In addition, as best seen in FIG. 12, cutout bench 20 includes sidewalls 21 which slope inwardly towards the top of insert 16.

Clamping arm 12 is mounted in a clamping arm slot 27 in insert housing 13. Clamping arm 12 includes an elongated hole 28 through which a pivoting axle 30 extends to allow rotation of clamping arm 12 thereabout from a clamping position shown in FIGS. 1 and 4 to a release position shown in FIG. 2. Pivoting arm 12 has clamp portion 22 extending from said elongated hole out of clamping arm slot 27 to a position over seat portion 18 and cutter insert 16. A pin member 24, in the illustrated embodiment having a semicircular profile, extends from clamp portion 22 towards cutter insert 16 and mates with a corresponding hole 26 in cutter insert 16. Use of pin member 24 is also preferred as often cutter inserts 16 are mounted in an inverted position and simply fall to the ground once released. Using the present invention, inverted cutter inserts 16 are held in place by pin member 24 to allow the operator to easily grasp for removal. Additionally, the inwardly sloping sidewalls 21 provide a slight downward force on insert 16 when insert 16 is pulled towards bench 20 by pin member 24. Alternatively, pin member 24 and corresponding hole 26 can have sloping sides which act to pull insert 16 more firmly to seat 18.

Those skilled in the art will recognize that the exact profile and shape of pin member 24 is not limited to the semicircular profile depicted in the drawings, but other shapes such as circular are certainly within the scope of the present invention.

When pin member 24 is engaged with cutter insert 16, elongated hole 28 is pitched at an angle whereby clamping arm 12 is pulled inwards by a portion of the clamping force thereby seating cutter insert 16 firmly in a clamped position. Extending at an angle from elongated hole 28 into clamping arm slot 27 opposite clamp portion 22 is an arm 32 whose distal end 34 of clamping arm 12 rests upon cam 14.

Clamping arm 12 is biased to the release position by a clamping arm compression spring 36 which is mounted into a channel 38 formed in insert housing 13 and aligned with a corresponding channel 40 in arm 32. Clamping arm compression spring 36 is positioned to engage arm 32 between elongated hole 28 and distal end 34.

Cam 14 is generally a linear cylindrical profile which is mounted into insert housing 13 in a cam cavity 42. A button 44 is positioned outside cam cavity 42 at one end of cam 14. The other end of cam 14 engages a cam spring 46 which is a compression spring positioned in cam cavity 42 opposite button 44. Cam cavity 42 and clamping arm slot 27 are connected within insert housing 13 whereby distal end 34 of clamping arm 12 rests upon cam 14.

Figures 10, 11:
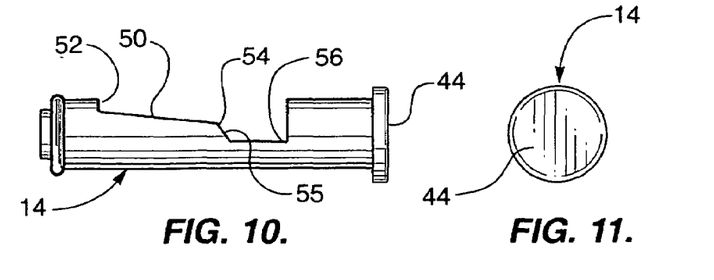
FIG. 10 is a side view of the cam.
FIG. 11 is a front view of the cam.

As best seen in FIGS. 3 and 10, intermediate between button 44 and cam spring 46, cam 14 includes a sloped portion 50 which slopes inwardly from a shallow cut 52 proximate to cam spring 46 to a deeper cut 54 in the direction of button 44. A trough 56 extends further into cam 14 from deeper cut 54 proximate to and towards button 44.

Cam spring 46 biases cam 14 towards button 44 whereby distal end 34 rests upon sloped portion 50. Sloped portion 50 rotates clamping arm 12 to the clamp position and holds at that position. This metal to metal push results in a firm clamp position by elimination of any give or spring in the design thereof.

To change from the clamp position to the release position, button 44 is pushed firmly toward insert housing 13 which pushes cam 14 inwards against a cam spring 46. Distal end 34 of clamping arm 12 moves from sloped portion 50 to drop into trough 56 via a sharp drop off 55. When distal end 34 reaches trough 56, cam 14 is in a fully disengaged position which allows clamping arm 12 to drop to the release position, said rotation being assisted by the clamping arm compression spring 36. As noted previously, clamping arm compression spring 36 holds clamping arm 12 in the release position thereby allowing the user to simply remove old cutter insert 16 and replace with a new cutter insert 16 (or simply rotate old insert to bring a new cutting surface to bear).

It should also be noted that such the use of trough 56 fall off holds the clamp portion far enough away to allow easy removal of same and also now biases the device to the removal position for "hands free" operation. Further, if pin member 24 does not engage hole 26 fully, from either poor positioning or dirt or debris in hole 26, distal end 34 cannot be lifted to clear trough 56 whereby quick change tool holder 10 remains in the release position thereby warning the operator of an unsafe or improper condition. Also, the steepness of drop off 55 controls the force needed to return to the clamp position.

To return to the clamp position, the user simply presses downwardly on clamp portion 22. The resistance of clamping arm compression spring 36 is overcome and distal end 34 of clamping arm 12 re-engages the sloped portion 50 of cam 14 to push, with assistance from cam spring 46. Cam 14 is then back to a fully clamped position for cutter insert 16 use. The force needed to return to the clamp position is controlled by the angle of drop off 55. In some usages, for example, very high horsepower, small angles are desired whereby the operator must operate button 44 prior to, and while pressing downwardly on clamp portion 22 to reengage to reduce jamming caused by small angles.

Turning now to FIGS. 13-20, a number of alternate embodiments of locking mechanism 15 are shown. The present invention is not meant to be limited to the illustrated embodiments. These alternate embodiments are provided for exemplary purposes and those skilled in the art will recognize that other locking mechanisms 15 are suitable for use in a self contained, toolless quick change tool holder 10.

Figure 13:
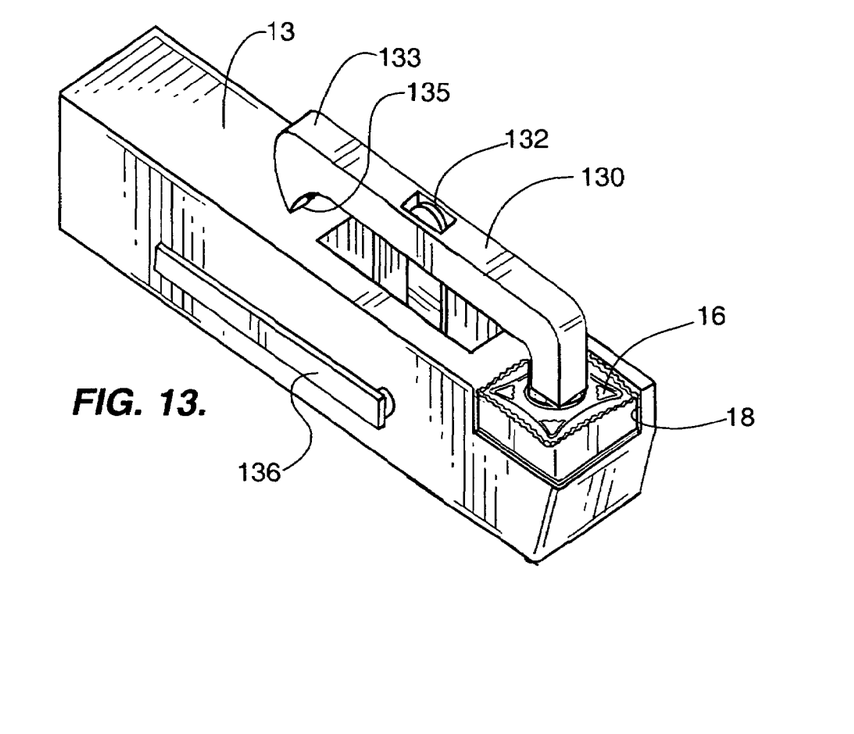
FIG. 13 is a perspective top and side view of an alternate embodiment of the present invention.
Figure 14:
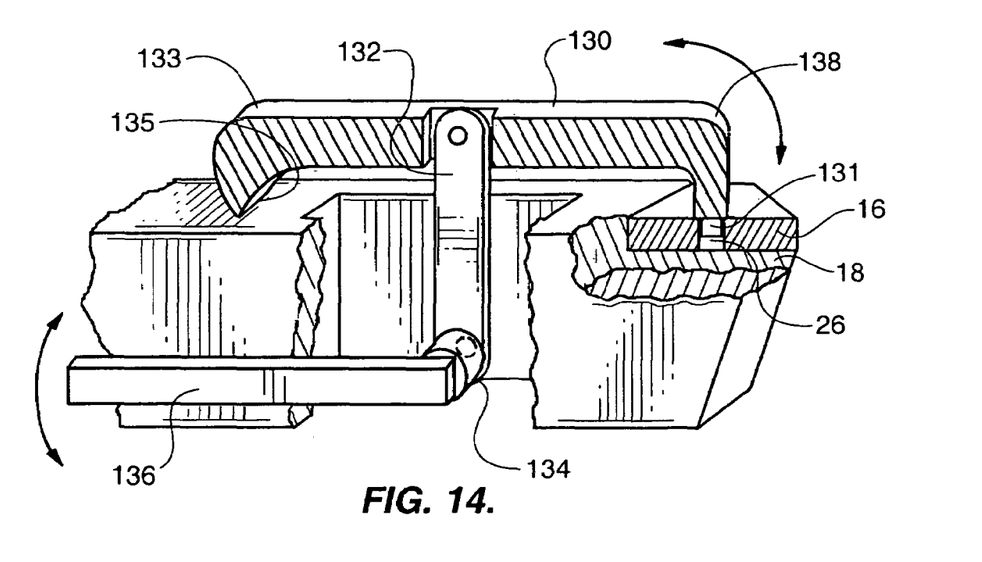
FIG. 14 is a partial cutaway side and top perspective view of the embodiment of FIG. 13.

As shown in FIGS. 13 and 14, a clamping arm 130 is rotatably mounted proximate to its midpoint to one end of a shaft 132. Pivoting arm 130 has a clamp portion 138 extending from said midpoint to a position over seat portion 18 and cutter insert 16. A pin member 131 extends from clamp portion 138 towards cutter insert 16 and mates with a corresponding hole 26 in cutter insert 16. Use of pin member 131 is also preferred as often cutter inserts 16 are mounted in an inverted position and simply fall to the ground once released. Using the present invention, inverted cutter inserts 16 are held in place by pin member 131 to allow the operator to easily grasp for removal.

Clamping arm 130 includes a brace portion 133 which extends opposite said clamp portion 138 from the midpoint. Brace portion 133 includes a downwardly extending edge 135 which rests upon housing 13 and provides leverage thereupon when shaft 132 is moved.

The other end of shaft 132 is pivotally mounted to an eccentric 134 which, in turn, is operably connected to one end of a lever 136. Lever 136 has a clamp position and a release position. In FIG. 13, the actions of lever 136, eccentric 134, shaft 132 and clamping arm 130 hold cutting insert 16 firmly in seat portion 18 for cutting. However, when lever 136 is lifted upwardly, the rotation of eccentric 134 lifts shaft 132 and hence clamping arm 130 upwardly and forwardly to the release position whereby cutting insert 16 can be rotated or replaced as needed.

Figure 15:
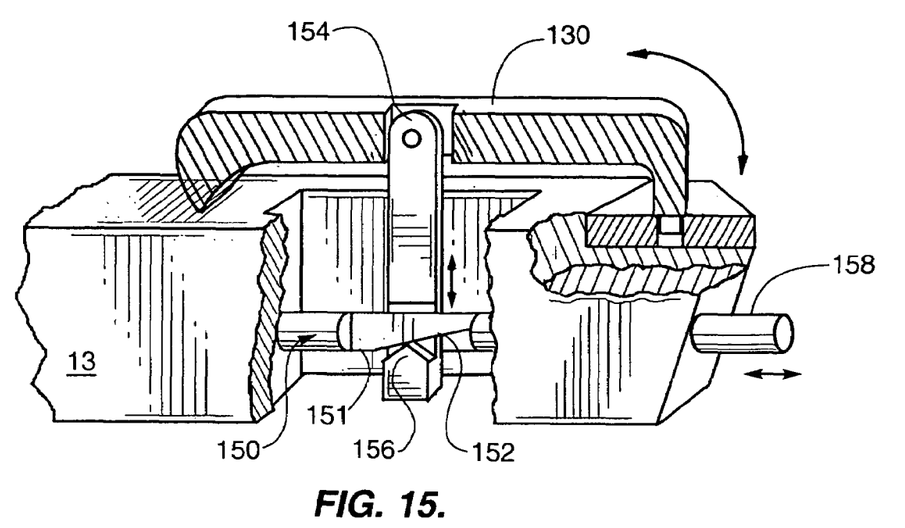
FIG. 15 is a partial cutaway side and top perspective view of still another embodiment of the present invention.
Figure 16:
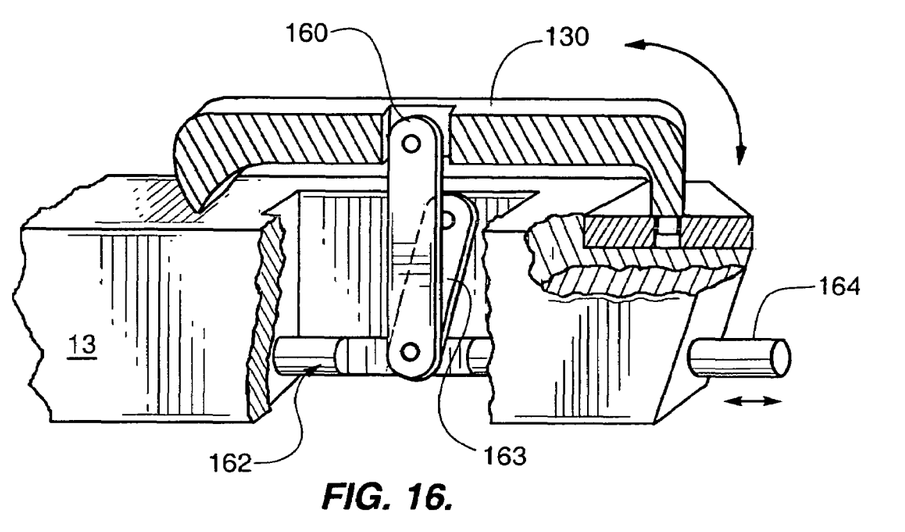
FIG. 16 is a partial cutaway side and top perspective view of still another embodiment of the present invention.

Variants which use a clamping arm similar to clamping arm 130 are shown in FIGS. 15 and 16. In FIG. 15, one end of a shaft 154 engages the midpoint of clamping arm 130 as previously described in connection with the discussion relating to FIGS. 13 and 14. A push rod 150 having a wedge lock 152 engages the other end of shaft 154. The other end of shaft 154 includes a triangular shaped wedge 156 which engages wedge lock 152. Push rod 150 extends from housing 13, the portion of push rod 150 extending from housing 13 thereby forming a button 158. FIG. 15 illustrates the release position whereby cutter insert 16 can be easily removed or repositioned. To move to the clamp position, a user pushes downwardly on clamping arm 130. In turn, shaft 154 and wedge 156 move downwardly. Push rod 150 is biased to move outwardly and hence moves in that direction until wedge 156 encounters a flat area 151 of push rod 150 where it rests in the clamp position. A user pushes button 158 to return to the release position.

In FIG. 16, one end of a shaft 160 engages the midpoint of clamping arm 130 as previously described in connection with the discussion relating to FIGS. 13 and 14. A push rod 162 engages the other end of shaft 160. In addition, one end of a second shaft 163 engages the other end of shaft 160 where it engages push rod 162. The other end of second shaft 163 is rotatably mounted to housing 13 at an angle from shaft 160. Push rod 162 extends from housing 13, the portion of push rod 162 extending from housing 13 thereby forming a button 164. FIG. 15 illustrates the release position whereby cutter insert 16 can be easily removed or repositioned. To move to the clamp position, a user pushes downwardly on clamping arm 130. In turn, shaft 160 moves downwardly. Under the action of second shaft 163, push rod 162 moves outwardly and hence moves in that direction until it rests in the clamp position. A user pushes button 164 to return to the release position.

Figure 17:
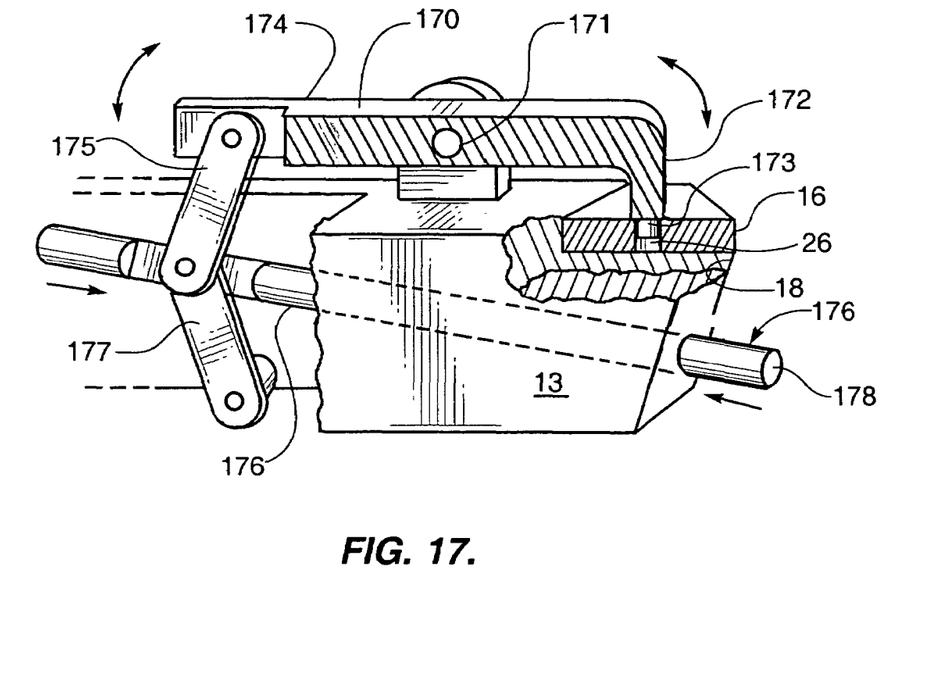
FIG. 17 is a partial cutaway side and top perspective view of still another embodiment of the present invention.

As shown in FIG. 17, a clamping arm 170 is rotatably mounted to a pivot 171 proximate to its midpoint. Pivoting arm 170 has a clamp portion 172 extending from said midpoint to a position over seat portion 18 and cutter insert 16. A pin member 173 extends from clamp portion 172 towards cutter insert 16 and mates with a corresponding hole 26 in cutter insert 16. Use of pin member 173 is also preferred as often cutter inserts 16 are mounted in an inverted position and simply fall to the ground once released. Using the present invention, inverted cutter inserts 16 are held in place by pin member 173 to allow the operator to easily grasp for removal.

Clamping arm 170 includes a rear portion 174 which extends opposite said clamp portion 172 from pivot 171. Rear portion 174 is mounted to one end of a first shaft 175 which extends into housing 13. The other end of first shaft 175 engages a push rod 176. In addition, one end of a second shaft 177 engages the other end of first shaft 175 where it engages push rod 176. The other end of second shaft 177 is rotatably mounted to housing 13 opposite from clamping arm 170. Push rod 176 extends from housing 13, the portion of push rod 176 extending from housing 13 thereby forming a button 178. FIG. 17 illustrates the release position whereby cutter insert 16 can be easily removed or repositioned. To move to the clamp position, a user pushes downwardly on clamp portion 172 thereby causing clamping arm 170 to rotate about pivot 171. In turn, first shaft 175 moves upwardly under restraint by second shaft 177. Under the action of shafts 175 and 177, push rod 176 moves outwardly until it rests in the clamp position. A user pushes button 178 to return to the release position.

Figure 18:
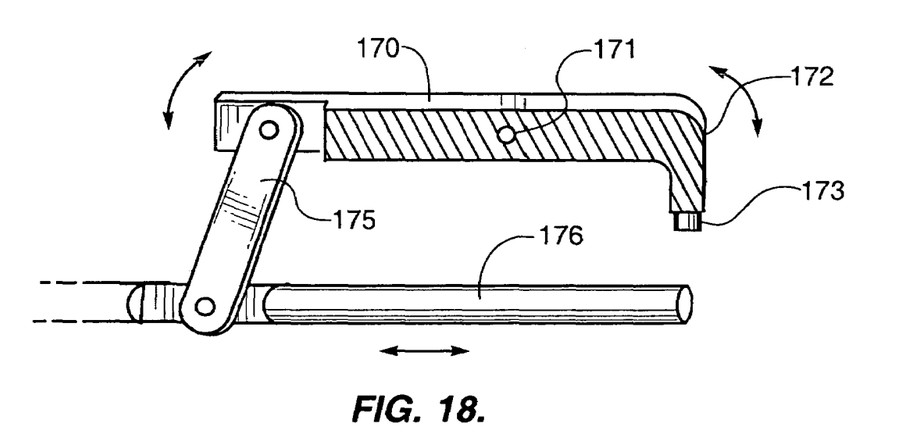
FIG. 18 is a partial cutaway side and top perspective view of still another embodiment of the present invention.

FIG. 18 illustrates another version very similar to FIG. 17 without second shaft 177.

Figure 19:
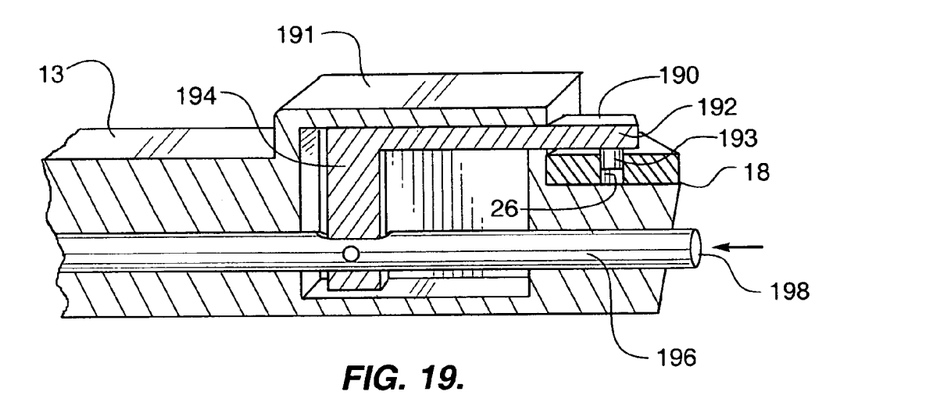
FIG. 19 is a partial cutaway side and top perspective view of still another embodiment of the present invention engaging a cutter insert.
Figure 20:
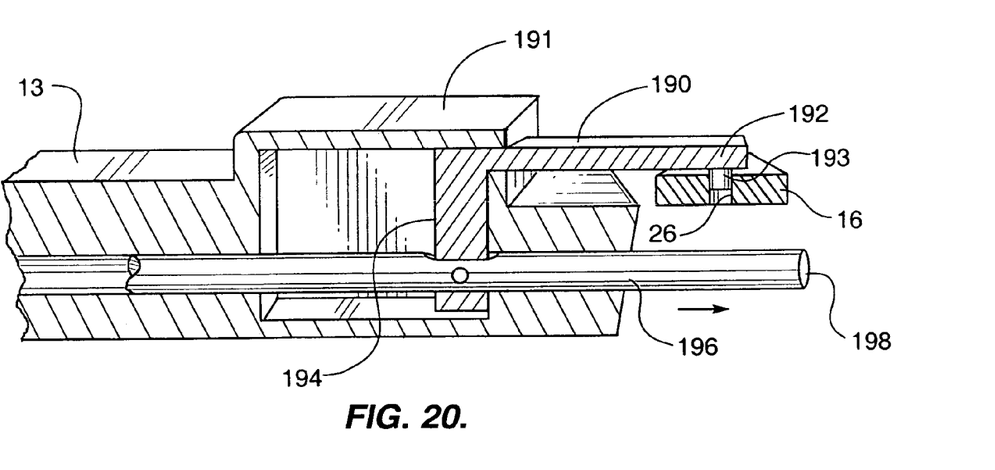
FIG. 20 is a partial cutaway side and top perspective view of the embodiment of FIG. 19 disengaged from a cutter insert.

As shown in FIGS. 19 and 20, an L-shaped clamping arm 190 is slidably mounted to housing 13. In this embodiment, housing 13 includes a clamping arm cover 191 which extends over clamping arm 190. One leg of L-shaped clamping arm 190 is a clamp portion 192 extending a position over seat portion 18 and cutter insert 16. A pin member 193 extends from clamp portion 192 towards cutter insert 16 and mates with a corresponding hole 26 in cutter insert 16. Use of pin member 193 is also preferred as often cutter inserts 16 are mounted in an inverted position and simply fall to the ground once released. Using the present invention, inverted cutter inserts 16 are held in place by pin member 193 to allow the operator to easily grasp for removal.

The other leg of L-shaped clamping arm 190 forma a rear portion 194 which extends downwardly opposite said clamp portion 192. Rear portion 194 engages a push rod 196. Push rod 196 extends from housing 13, the portion of push rod 196 extending from housing 13 thereby forming a button 198. FIG. 20 illustrates the release position whereby cutter insert 16 can be easily removed or repositioned. To move to the clamp position, a user pushes on clamp portion 192 thereby causing clamping arm 190 and push rod 196 to slide to the positions illustrated in FIG. 19. A user pulls button 198 to return to the release position.

The above embodiments refer to manual initiation and movement, usually via push button, for initiating and then moving between a clamp position and a release position. Those skilled in the art will recognize that this process is subject to automation whereby initiation of the change can be done electrically, by timer, by a machine generated computer program as well as manually. In addition, the actual movement between the two positions can be done by solenoids springs, mechanically, electrically, hydraulically, pneumatically, magnetically, via use of resilient plastics, electromechanically, electromagnetically as well as manually. The present invention is not meant to be limited to the illustrated embodiments.

Although only certain embodiments have been illustrated and described, it will be apparent to those skilled in the art that various changes and modifications may be made therein without departing from the spirit of the invention or from the scope of the appended claims.

What is claimed is:

1. A self contained, toolless quick change tool holder for cutter inserts on machine tools, the self contained quick change tool holder comprising:

a housing having at least one seat portion which is adapted to receive and conform to the shape of a cutter insert, a clamping arm mounted in the insert housing, the clamping arm movable in the insert housing, the clamping arm having a clamp portion extending over the seat portion, the clamp portion adapted to engage a cutter insert, a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising a shaft, one end of said shaft being rotatably mounted proximate to a midpoint of the clamping arm, the other end of the shaft being pivotally mounted to an eccentric which is operably connected to one end of a lever, the lever, the eccentric, the shaft and the clamping arm having the clamp position which holds cutting insert in the seat, the lever lifting upwardly to rotate the eccentric which lifts the shaft and the clamping arm to the release position whereby the cutting insert is separable from the seat.

2. The self contained, toolless quick change tool holder of claim 1 wherein the clamping arm has a brace portion which extends opposite the clamp portion from the midpoint, the brace portion including an edge which engages the housing to provide leverage thereon.

3. A self contained. toolless quick change tool holder for cutter inserts on machine tools, the self contained quick change tool holder comprising:

a housing having at least one seat portion which is adapted to receive and conform to the shape of a cutter insert, a clamping arm mounted in the insert housing, the clamping arm movable in the insert housing, the clamping arm having a clamp portion extending over the seat portion, the clamp portion adapted to engage a cutter insert, a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising a shaft, one end of said shaft being rotatably mounted proximate to a midpoint of the clamping arm, the other end of the shaft having a wedge which is adapted to engage a wedge lock mounted to a push rod, the push rod, the wedge lock, the wedge, the shaft and the clamping arm having the clamp position which holds cutting insert in the seat, the push rod laterally moving to operate the wedge lock and wedge to move the shaft and the clamping arm to the release position whereby the cutting insert is separable from the seat, the lateral movement being reversible to move the clamping arm to the clamp position.

4. The self contained, toolless quick change tool holder of claim 3 wherein the clamping arm has a brace portion which extends opposite the clamp portion from the midpoint, the brace portion including an edge which engages the housing to provide leverage thereon.

5. A self contained, toolless quick change tool holder for cutter inserts on machine tools, the self contained quick change tool holder comprising:
   a housing having at least one seat portion which is adapted to receive and conform to the share of a cutter insert,
   a clamping arm mounted in the insert housing, the clamping arm movable in the insert housing, the clamping arm having a clamp portion extending over the seat portion, the clamp portion adapted to engage a cutter insert,
   a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising a shaft, one end of said shaft being rotatably mounted proximate to a midpoint of the clamping arm, the other end of the shaft engaging a push rod, one end of a second shaft also engaging the other end of the shaft, the other end of the second shaft being rotatably mounted to the housing at an acute angle from the shaft, the clamping arm, the first shaft, the second shaft and the push rod defining the clamp position which holds cutting insert in the seat, the push rod laterally moving to operate rotate the shaft and the second shaft to move the shaft and the clamping arm to the release position whereby the cutting insert is separable from the seat, the lateral movement being reversible to move the clamping arm to the clamp position.

6. A self contained, toolless quick change tool holder for cutter inserts on machine tools, the self contained quick change tool holder comprising:
   a housing having at least one seat portion which is adapted to receive and conform to the shape of a cutter insert,
   a clamping arm mounted in the insert housing, the clamping arm movable in the insert housing, the clamping arm having a clamp portion extending over the seat portion, the clamp portion adapted to engage a cutter insert,
   a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising rotatably mounting the clamping arm to a pivot proximate to the midpoint of the clamping arm, the locking mechanism further comprising a first shaft, one end of said first shaft being rotatably mounted to a one end of the clamping arm, the other end of the first shaft engaging a push rod, one end of a second shaft also engaging the other end of the first shaft, the other end of the second shaft being rotatably mounted to the housing at a position extending opposite the first shaft, the clamping arm, the first shaft, the second shaft and the push rod defining the clamp position which holds cutting insert in the seat, the push rod laterally moving to operate rotate the first shaft and the second shaft to move the shaft and the clamping arm to the release position whereby the cutting insert is separable from the seat, the lateral movement being reversible to move the clamping arm to the clamp position.

7. A self contained, toolless quick change tool holder for cutter inserts on machine tools, the self contained quick change tool holder comprising:
   a housing having at least one seat portion which is adapted to receive and conform to the shape of a cutter insert,
   a clamping arm mounted in the insert housing, the clamping arm movable in the insert housing, the clamping arm having a clamp portion extending over the seat portion, the clamp portion adapted to engage a cutter insert,
   a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising rotatably mounting the clamping arm to a pivot proximate to the midpoint of the clamping arm, the locking mechanism further comprising a shaft, one end of said first shaft being rotatably mounted to a one end of the clamping arm, the other end of the shaft engaging a push rod, the clamping arm, the shaft, and the push rod defining the clamp position which holds cutting insert in the seat, the push rod laterally moving to operate rotate and move the shaft and the clamping arm to the release position whereby the cutting insert is separable from the seat, the lateral movement being reversible to move the clamping arm to the clamp position.

8. A self contained, toolless quick change tool holder for cutter inserts on machine tools, the self contained quick change tool holder comprising:
   a housing having at least one seat portion which is adapted to receive and conform to the shape of a cutter insert,
   a clamping arm mounted in the insert housing, the clamping arm movable in the insert housing, the clamping arm having a clamp portion extending over the seat portion, the clamp portion adapted to engage a cutter insert,
   a locking mechanism completely contained within the housing, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools, the locking mechanism comprising slidably mounting the clamping arm to the housing, the clamping arm being L-shaped with one leg of said L-shape forming the clamp portion, the other leg of the L-shape engaging a push rod, the clamping arm and the push rod defining the clamp position which holds cutting insert in the seat, the push rod laterally moving to slide clamping arm to the release position whereby the cutting insert is separable from the seat, the lateral movement being reversible to move the clamping arm to the clamp position.

* * * * *